UNITED STATES PATENT OFFICE.

LORENZ ACH, OF MANNHEIM, GERMANY, ASSIGNOR TO C. F. BOEHRINGER & SOEHNE, OF MANNHEIM-WALDHOF, GERMANY.

OXYTARTRONIC ACID AND PROCESS OF MAKING SAME.

SPECIFICATION forming part of Letters Patent No. 676,864, dated June 25, 1901.

Application filed December 23, 1899. Serial No. 741,447. (Specimens.)

*To all whom it may concern:*

Be it known that I, LORENZ ACH, a citizen of the Empire of Germany, residing a Mannheim, in the Empire of Germany, have invented certain new and useful Improvements in Oxytartronic Acid; and I do hereby declare the following to be a full, clear, and exact description of the invention, such as will enable others skilled in the art to which it appertains to make and use the same.

The present invention relates to the manufacture of tartronic-acid derivatives; and the object of the same is the production of "oxyphenyltartronic acids," under which term I embrace the oxyphenyltartronic acids proper, as well as the substitution products of the same formed by substituting—*e. g.*, a radical of the fatty or aromatic series in the benzene ring of the phenyl group, as will be readily understood. All of these acids have hitherto been unknown.

I have found that the condensation products of phenols and alloxan obtained by the methods set forth in my application, Serial No. 708,003, filed March 6, 1899, may be saponified so as to form oxyphenyltartronic acids in a manner analogous to that for preparing amidophenyltartronic acids, set forth in Fritz Ach's application, Serial No. 731,674, filed September 25, 1899. Under this treatment the urea-residue of the alloxan group or ring is split off, such separation being accompanied by evolution of carbonic acid and ammonia. This process is illustrated—for example, for phenol-alloxan—by the following equation:

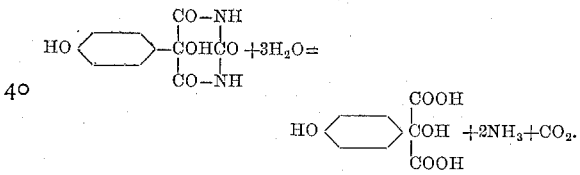

The saponification is in this case preferably effected by the action of an excess of alkali and heat. The oxyphenyltartronic acids are thus first obtained in the form of alkali salts, though in some cases the less soluble barium salts are more readily adapted for the isolation of the acids.

The free oxyphenyltartronic acids are strong acids which are readily soluble in water. Unlike their stable salts they decompose readily with evolution of carbonic acid, in part even at low temperatures. Ammoniacal silver solutions of the same are reduced under the influence of heat with formation of a silver mirror.

Broadly considered, my invention consists in heating the condensation products hereinabove referred to with alkali. The said invention also consists in such further features, steps, and methods as will be hereinafter set forth, and pointed out in the claims.

In order to fully set forth my said invention, I will now recite a number of examples embodying the preferred manner of carrying the same into effect.

1. *Preparation of para-oxyphenyltartronic acids.*—Ten parts, by weight, of phenol-alloxan are introduced into twenty-five parts, by volume, of potash solution (KHO) of ten times normal strength, which has been heated on the water-bath. The introduction is accompanied by stirring. The phenol-alloxan under this treatment rapidly goes into solution, while ammonia simultaneously escapes with effervescence or frothing. The resultant clear solution is then heated for several hours, attended by constant stirring, until the odor of ammonia has almost disappeared. The reaction proceeds according to the equation:

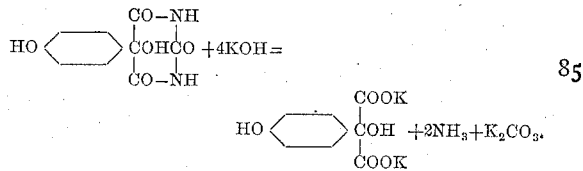

The free para-oxyphenyltartronic acid which is thus formed is isolated by cautiously acidulating the whole, preferably with sulfuric acid, in the cold and repeated extraction of the acid solution with ether. Upon carefully evaporating the ether the new acid remains as a colorless oily liquid which rapidly crystallizes. For purifying the same it is taken up in a small quantity of ether at room-temperature and precipitated by means of benzene. It crystallizes in the form of colorless small needles, which melt at from 118° to 120° centigrade, with evolution of gas. It is, however, preferable to isolate the para-oxyphenyltartronic acid as a neutral potassium salt. For this purpose the strong alkaline solution of the same remaining after the escape of the ammonia is acidulated with acetic acid, and after somewhat concentrating this solution alcohol (about three parts) is added thereto. The neutral potassium salt of the new acid is thereby precipitated in the form of fine colorless crystals, which have the composition represented by the formula $C_9H_6O_6K_2$, while the acetate of potassium remains in solution.

As described in my application, Serial No. 708,003, filed March 6, 1899, the alloxan-phenol employed as a starting material in this process is prepared as follows: I dissolve 21.4 kilograms of alloxan in seventy liters of water and add to the solution 9.4 kilograms of phenol and mix the whole by stirring or otherwise agitating. By this action the phenol becomes suspended to the alloxan solution. I then introduce into the suspended mixture a strong current or jet of hydrochloric acid in the form of a gas or in aqueous solution, taking care at the same time that the mixture does not become too highly heated by this action. This is best done by cooling by water circulating around or through the mixture. The temperature should not rise above 60° to 70° centigrade. As a result of this treatment the phenol gradually goes into solution. When a clear solution has been attained, the introduction of hydrochloric acid is discontinued and the whole is allowed to stand until it congeals or solidifies in the form of a thick pasty mass of crystals. The crystals are then separated from the mother-liquor and purified by recrystallizing from water. In this way the new condensation compound is obtained in the shape of beautiful colorless large-sized crystals whose composition corresponds to the formula $$C_{10}H_8N_2O_5 + H_2O.$$

These crystals become colored yellow when heated to over 200° centigrade, and they melt at from 255° to 257° centigrade. The melting takes place with violent evolution of gases and consequent decomposition. As is manifest, the operation is equally successful when a solution of alloxan in hydrochloric acid or an alloxan solution very strongly acidulated with HCl is employed instead of the above aqueous solution of the alloxan. Under these conditions the separate introduction of the HCl current may be entirely or partly dispensed with. Such acidulated alloxan solutions may be obtained directly by oxidizing uric acid with hydrochloric acid and chlorate of potash. It is of considerable advantage to hasten the solution of the phenol to add a quantity of alcohol. For example, the process may be carried out as follows: To a warm solution of 21.4 kilograms of alloxan in an equal quantity of water are added 9.4 kilograms of phenol and ten liters of alcohol. To the clear solution thus obtained are added twenty-one liters of fuming hydrochloric acid of specific gravity 1.19, and the whole is gently warmed on the water-bath. After a short time the alloxan-phenol begins to separate, the quantity of the same being considerably increased on cooling.

2. *Preparation of para-oxy-meta-methoxy-phenyltartronic acid.*—Ten parts, by weight, of alloxanguaiacol are introduced into twenty-two parts, by volume, of caustic-potash solution (KHO) of ten times normal strength, which have been heated on the water-bath. The introduction is attended by stirring and the solution is heated at a temperature of 95° centigrade until the ammonia evolved has disappeared. The solution is then acidulated with acetic or equivalent acid and the solution is somewhat concentrated, whereupon two to four parts of alcohol are added thereto. The neutral potassium salt of the new acid is thereby precipitated in the form of fine needles having the composition represented by the formula $C_{10}H_8O_7K_2$. The reaction proceeds according to the equation:

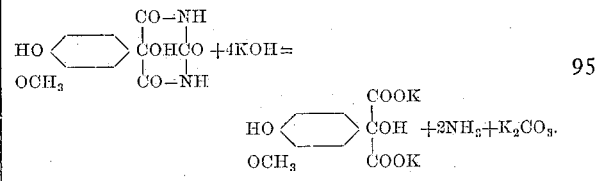

The free acid may be obtained by acidulating a solution of this salt with a mineral acid, such as sulfuric acid, in the cold and extracting with ether. On cautiously evaporating the ether the new acid remains as a syrupy mass, which congeals to a crystalline mass.

The alloxan-guaiacol employed as a starting material in the above process may be prepared according to my application, Serial No. 708,003, filed March 6, 1899—*i. e*, as follows: Five hundred and twenty grams of alloxan are dissolved in an equal quantity, by weight, of hot water. To this solution are added seven hundred grams fuming hydrochloric acid and a solution of three hundred grams of guaiacol in four hundred grams of alcohol. Into the clear liquid obtained, which is maintained at room temperature, (about 15° centigrade,) hydrochloric acid is introduced until the solution begins to give off fumes. After the lapse of several hours the condensation product separates off. The same is then removed by siphoning or decanting and recrystallized from water, when it is obtained in the form of coarse crystals containing one molecule of water of crystallization. They melt at 150° centigrade, the melting being attended by gas evolution.

The new compound has the formula $C_{11}H_{10}N_2O_6$, and the reaction which takes place in its formation is expressed in the equation $C_6H_4(OH)(OCH_3) + C_4H_2N_2O_4 = C_{11}H_{10}N_2O_6$.

3. *Preparation of ortho-oxy-meta-toluyltartronic acid.*—Ten parts, by weight, of alloxanpara-cresol are introduced into twenty-five parts, by volume, of caustic-potash (KHO) solution of ten times normal strength, and the resultant solution is evaporated as much as possible over the water-bath and until crystals are separated while the mass is still heated. On cooling the whole congeals to a crystalline mass, which is then well drained and pressed to remove as much moisture as possible. By this means the potassium salt of the new acid is obtained as light-yellow crystalline mass having an alkaline reaction. The process is indicated in the equation:

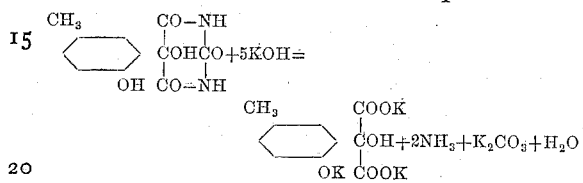

*4. Preparation of meta-para-dioxyphenyltartronic acid.*—Ten parts, by weight, of pyrocatechinalloxan are introduced into twenty-eight parts, by volume, of solution of hydrate of potash (KHO) of ten times the normal strength, and this mixture is heated on the water-bath and coincidently stirred until the ammonia generated is driven off. Thereupon a solution of ten parts of barium chlorid is added and the whole is aciduated with acetic or equivalent acid. The barium salt of the new acid, the dioxyphenyltartronic acid, having the composition $C_9H_6O_7Ba + H_2O$, is then duly thrown out in the form of shining plates or scales. The reaction of this process is indicated in the equation:

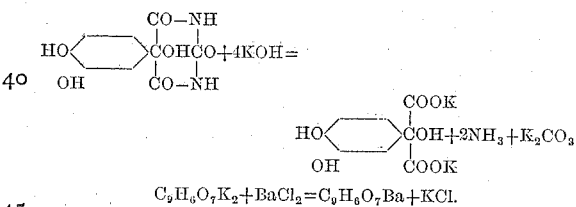

$C_9H_6O_7K_2 + BaCl_2 = C_9H_6O_7Ba + KCl.$

To obtain the free acid, the above alkaline solution is aciduated in the cold with a mineral acid, such as sulfuric acid, and repeatedly extracted with ether. Upon carefully evaporating the ether from the extract the acid will remain as a pale-colored syrup, which decomposed even at room-temperature, giving off carbon-dioxid.

These new acids have the general composition indicated by the formula,

where H denotes the radical of a univalent or multivalent phenol less one atom of hydrogen.

What I claim, and desire to secure by Letters Patent of the United States, is—

1. The process of preparing oxyphenyltartronic acids which consists in treating a condensation product of a phenol and alloxan with an alkali.

2. The process of preparing oxyphenyltartronic acids which consists in introducing a condensation product of a phenol and alloxan into alkali solution and heating the whole.

3. The process of preparing oxyphenyltartronic acids which consists in introducing a condensation product of a phenol and alloxan into alkali solution and heating and stirring the whole uniformly at a moderate temperature.

4. The process of preparing oxyphenyltartronic acids which consists in introducing a condensation product of a phenol and alloxan into alkali solution and heating the whole until the ammonia has been driven off and then acidulating for the purpose of isolating the acid or a salt thereof.

5. The process of preparing oxyphenyltartronic acids which consists in introducing a condensation product of a phenol and alloxan into alkali solution and heating and stirring the whole uniformly at a moderate temperature until the ammonia has been driven off and then acidulating for the purpose of isolating the acid or a salt thereof.

6. The process of preparing oxyphenyltartronic acids which consists in introducing a condensation product of a phenol and alloxan into alkali solution and heating and stirring the whole over a water-bath, then acidulating with acetic or equivalent acid and concentrating the solution somewhat and finally adding alcohol to precipitate the alkali salt of the acid.

7. The process of preparing oxyphenyltartronic acids which consists in introducing a condensation product of a phenol and alloxan into alkali solution and heating and stirring the whole over a water-bath and then acidulating with a mineral acid and finally extracting the new acid with ether.

8. As a new series of chemical compounds oxyphenyltartronic acids having the general formula above given and which are strong acids readily soluble in water, very unstable, decomposing readily with evolution of carbonic acid and which reduce an ammoniacal silver solution with formation of a silver mirror.

In testimony whereof I affix my signature in presence of two witnesses.

LORENZ ACH.

Witnesses:
LEO BEENSCH,
JACOB ADRIAN.